(12) United States Patent
Bell et al.

(10) Patent No.: US 9,916,068 B1
(45) Date of Patent: Mar. 13, 2018

(54) GRAPHICAL USER INTERFACE FOR DISPLAYING ALARM SECURITY LEVEL OF GROUPS OF ELEMENTS

(71) Applicants: Mark Bell, Fort Collins, CO (US); Timothy O'Connor, Fort Collins, CO (US); Justin Cobb, Windsor, CO (US); Ken Adamson, Campbell, CO (US)

(72) Inventors: Mark Bell, Fort Collins, CO (US); Timothy O'Connor, Fort Collins, CO (US); Justin Cobb, Windsor, CO (US); Ken Adamson, Campbell, CO (US)

(73) Assignee: CA, Inc., New York, NY (US)

( * ) Notice: Subject to any disclaimer, the term of this patent is extended or adjusted under 35 U.S.C. 154(b) by 290 days.

(21) Appl. No.: 13/800,192

(22) Filed: Mar. 13, 2013

(51) Int. Cl.
*G06F 3/0484* (2013.01)

(52) U.S. Cl.
CPC ............................... *G06F 3/04842* (2013.01)

(58) Field of Classification Search
CPC ...... G06F 19/327; G06Q 10/06; G06Q 50/24; G06Q 50/22; G06Q 10/0633
See application file for complete search history.

(56) References Cited

U.S. PATENT DOCUMENTS

| | | | | |
|---|---|---|---|---|
| 5,261,044 A * | 11/1993 | Dev et al. | ...................... | 715/855 |
| 6,112,015 A * | 8/2000 | Planas | ..................... | H04L 41/22 |
| | | | | 709/220 |
| 6,456,306 B1 * | 9/2002 | Chin | ................... | H04L 41/0213 |
| | | | | 709/224 |
| 6,664,978 B1 * | 12/2003 | Kekic | ................. | H04L 41/0213 |
| | | | | 709/203 |
| 8,589,256 B2 * | 11/2013 | Tays | ....................... | G06Q 10/06 |
| | | | | 340/968 |
| 8,694,908 B2 * | 4/2014 | Christensen | ........ | G06F 3/04817 |
| | | | | 715/772 |
| 9,086,967 B2 * | 7/2015 | Power | ................... | H04L 41/044 |
| 2002/0046299 A1 * | 4/2002 | Lefeber | .................. | H04L 29/06 |
| | | | | 719/318 |
| 2003/0037177 A1 * | 2/2003 | Sutton | ................... | H04L 41/024 |
| | | | | 719/316 |
| 2003/0046386 A1 * | 3/2003 | Takats | .......................... | 709/224 |
| 2007/0033169 A1 * | 2/2007 | Friedman | .......... | G06F 17/30551 |
| 2012/0130738 A1 * | 5/2012 | Hernandez | ............ | G06F 19/327 |
| | | | | 705/2 |

\* cited by examiner

*Primary Examiner* — Kevin L Young
*Assistant Examiner* — F J Farhadian
(74) *Attorney, Agent, or Firm* — Baker Botts L.L.P.

(57) ABSTRACT

A method of generating a graphical user interface is disclosed. The method includes monitoring a plurality of elements of a computer system and collecting information related to each of the plurality of elements. The method also includes creating a first group icon including information related to a first element group, the first element group including a first set of elements of the plurality of elements, and creating a first set of element icons, each element icon including information related to an element of the first set of elements. The method also includes graphically displaying the first group icon, graphically displaying the first set of element icons in response to a signal indicating a user has selected the first group icon, and graphically displaying a first element-specific frame in response to a signal indicating the user has selected a particular element icon of the first set of element icons.

21 Claims, 6 Drawing Sheets

GRAPHICAL USER INTERFACE FOR DISPLAYING ALARM SECURITY LEVEL OF GROUPS OF ELEMENTS

BACKGROUND

The present disclosure relates to information services infrastructure and network management, and more specifically, to a graphical user interface used to display information related to monitored devices. Computer systems may include many devices communicatively coupled to one another via a network. Networking and sharing of devices adds a level of complexity that is not present with a single device, standing alone. Network and system administrators may manage network devices using various software tools, which may include a graphical user interface.

BRIEF SUMMARY

In one aspect of the present disclosure, a method of generating a graphical user interface is disclosed. The method includes monitoring a plurality of elements of a computer system and collecting information related to each element of the plurality of elements. The method also includes creating a first group icon including information related to a first element group, the first element group including a first set of elements of the plurality of elements. The method further includes creating a first set of element icons, each element icon including information related to a particular element of the first set of elements. The method also includes graphically displaying the first group icon, graphically displaying the first set of element icons in response to receiving a signal indicating that a user has selected the first group icon, and graphically displaying a first element-specific frame in response to receiving a signal indicating that the user has selected a particular element icon of the first set of element icons.

In another aspect of the present disclosure, a computer readable storage medium, comprising computer-executable instructions carried on the computer readable medium is disclosed. The instructions carried on the computer readable medium are readable by a processor and, when read and executed, configured to cause the processor to monitor a plurality of elements of a computer system and collect information related to each element of the plurality of elements. The instructions, when read and executed, are further configured to cause the processor to create a first group icon including information related to a first element group, the first element group including a first set of elements of the plurality of elements, and create a first set of element icons, each element icon including information related to a particular element of the first set of elements. The instructions, when read and executed, are still further configured to cause the processor to graphically display the first group icon, graphically display the first set of element icons in response to receiving a signal indicating that a user has selected the first group icon, and graphically display a first element-specific frame in response to receiving a signal indicating that the user has selected a particular element icon of the first set of element icons.

In yet another aspect of the present disclosure, an apparatus for monitoring a plurality of elements of a computer system is disclosed. The apparatus includes a processor and a memory communicatively coupled to the processor. The memory includes instructions operable, when executed by a processor, to cause the processor to monitor a plurality of elements of a computer system, and collect information related to each element of the plurality of elements. The memory further includes instructions operable, when executed by a processor, to cause the processor to create a first group icon including information related to a first element group, the first element group including a first set of elements of the plurality of elements, and create a first set of element icons, each element icon including information related to a particular element of the first set of elements. The memory still further includes instructions operable, when executed by a processor, to cause the processor to graphically display the first group icon, graphically display the first set of element icons in response to receiving a signal indicating that a user has selected the first group icon, and graphically display a first element-specific frame in response to receiving a signal indicating that the user has selected a particular element icon of the first set of element icons.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
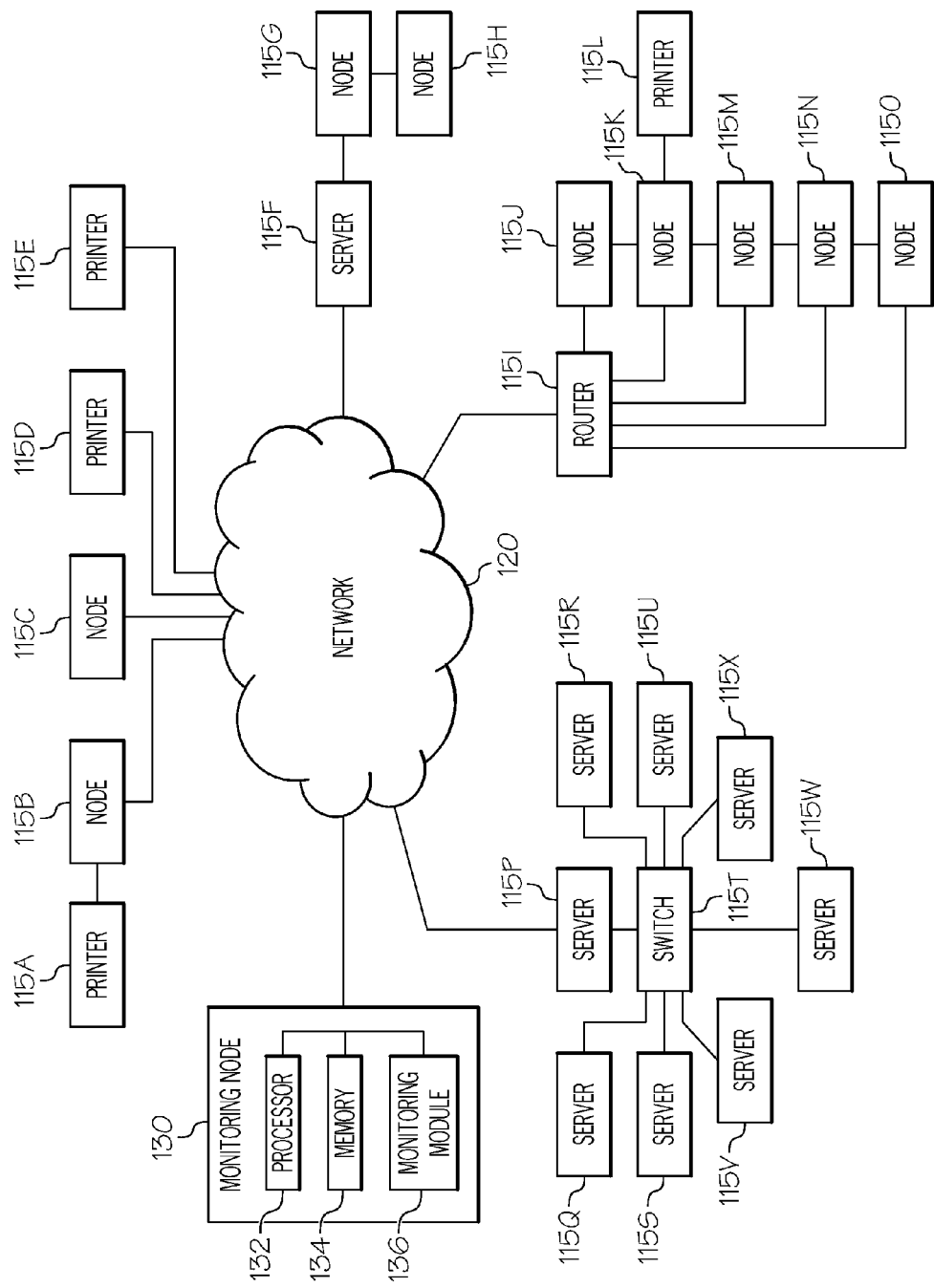
FIG. 1 is a block diagram of an example computer system including monitored elements and a monitoring node, in accordance with the teachings of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Traditional graphical user interfaces for software tools used by network and system administrators may display data to the user in a hierarchical tree structure. This type of graphical user interface may be difficult to navigate unless the user knows what information she is looking for and where that information is located in the hierarchical tree structure. In accordance with the teachings of the present disclosure, a graphical user interface may be provided in which status information associated with monitored elements (e.g., monitored nodes, devices, and applications) are displayed in container-like groups. Each top-level group may include individual monitored elements and/or sub-groups. Similarly, each sub-group may include individual monitored elements and/or additional sub-groups. Each element may be represented by an icon that includes information related to the element. Each group and/or sub-group may also be represented by an icon that includes information related to the elements in the group and/or sub-group. A user may access the icons representing elements and/or sub-groups in a particular group by clicking on the icon associated with that group. Similarly, a user may view more detailed information related to a particular element by clicking on the icon associated with that element.

Particular embodiments and their advantages are best understood by reference to FIGS. 1 through 7, wherein like numbers are used to indicate like and corresponding parts.

FIG. 1 is a block diagram of an example system 100, which may include a plurality of elements 115, a monitoring node 130, and a network 120. Each element 115 may include a physical or logical element communicatively coupled to monitoring node 130 via network 120. For example, each element 115 may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, or any other suitable device or application. Although example system 100 is shown in FIG. 1 as including a particular number of elements 115, a system may include more than or fewer than the number of elements 115 illustrated. Similarly, although example system 100 is shown in FIG. 1 as including elements 115 of particular types, a system may include elements 115 of types other than those shown in FIG. 1.

Network 120 may include a network and/or fabric configured to communicatively couple elements 115, monitoring node 130, and/or any element associated with information handling system 100. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Monitoring node 130 may include a processor 132, a memory 134, and a monitoring module 136. Processor 132 may be communicatively coupled to memory 134 and monitoring module 136. Processor 132 may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data.

Memory 134 may be configured in part or whole as application memory, system memory, or both. Memory 134 may include any system, device, or apparatus configured to hold and/or house one or more memory modules. Each memory module may include any system, device or apparatus configured to retain program instructions and/or data for a period of time (e.g., computer-readable storage media). For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Monitoring module 136 may include computer-program instructions resident in memory 134 (or another computer-readable medium communicatively coupled to monitoring node 130) and capable of being executed by processor 132. Monitoring module 136 may be configured to monitor the status and/or condition of elements 115 and collect information related to characteristics of elements 115. For example, monitoring module 136 may collect information related to both static characteristics of elements 115 (e.g., element name, IP address domain, operating system type, operating system name and version, etc.) and dynamic characteristics of elements 115 (e.g., the number and severity level of alarms, processor usage and performance, memory usage and performance, etc.). Monitoring module 136 may actively and/or passively monitor elements 115. For example, monitoring module 136 may actively monitor a particular element 115 by querying element 115 for specific information and/or measuring the time it takes element 115 to respond to queries. Monitoring module 136 may passively monitor a particular element 115 by, for example, accessing and analyzing an error log, or other performance related log maintained by an element 115.

Monitoring module 136 may also be configured to trigger an alarm if the status and/or condition of a particular element 115 meets or exceeds pre-defined alarm criteria. Alarm criteria may be set by a system administrator based on any monitored characteristic of a particular element. For example, alarm criteria may relate to the response time, performance, status and availability of elements 115. As another example, alarm criteria may relate to the processor load, processor queue length, and/or available memory of elements 115. For example, an alarm may be triggered if monitoring module 136 determines that the processor load for a particular element 115 has exceeded a threshold value. Monitoring module 136 may be further configured to designate an alarm severity level for each alarm. The alarm severity level for each alarm may be based on the type of alarm triggered and/or the amount by which the threshold value was exceeded. In some embodiments, monitoring module 136 may be configured to designate an alarm as critical, major, minor, or normal, wherein critical is the highest alarm severity level and normal is the lowest.

For monitoring purposes, elements 115 may be logically grouped based on characteristics of each element 115. The system administrator, based on organization policies and preferences, may determine how elements 115 will be grouped. In some embodiments, elements 115 may be grouped based on element type (e.g., servers, printers, etc.). In other embodiments, elements 115 may be grouped based on the organization to which each element 115 belongs. For example, elements 115 belonging to a particular business organization or department/division of a business organization may be grouped together. In still other embodiments, groups may be established based on the relationships among elements 115. For example, elements 115I-115O may be grouped together based on their relationship to one another—wherein elements 115J-115O are communicatively coupled to network 120 via element 115I. Similarly, elements 115P-115W may be grouped together based on their relationship to one another—wherein elements 115Q-115W are communicatively coupled to network 120 via element 115P. In another example, elements 115A, 115D, 115E, and 115L may be grouped based on element type—wherein elements 115A, 115D, 115E, and 115L are printers. Within the "printers" group, elements 115A, 115D, 115E, and 115L may be further divided into sub-groups based on element sub-type (e.g., printer model or brand). Although several example groupings have been provided, groups may be established based on any functional, logical, physical, or other characteristic of the elements of an information handling system. Each group may include elements and/or sub-groups.

Figure 2:
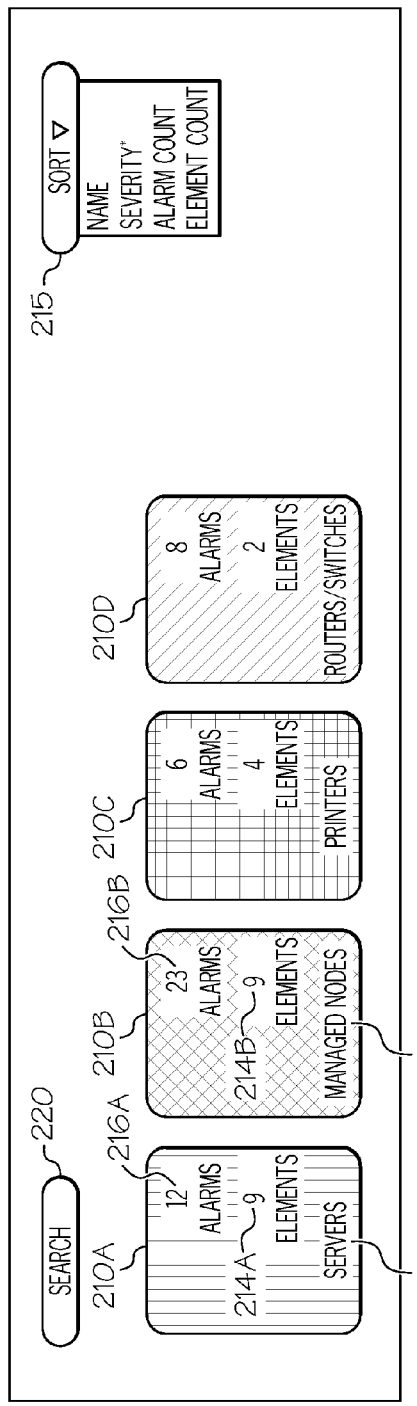
FIG. 2 is an illustration of an example graphical user interface including icons representing groups of elements, in accordance with the teachings of the present disclosure.

FIG. 2 illustrates an example graphical user interface generated by monitoring module 136 in accordance with the teachings of the present disclosure. Monitoring module 136 may be configured to provide a graphical user interface in which group icons 210 are graphically displayed. Each group icon 210 may represent a logical group of elements 115. As discussed above, elements 115 may be placed in logical groups for monitoring purposes. For example, group icon 210A may represent a group including server elements 115F, 115P-115S, and 115U-115X. The group of servers represented by group icon 210A may be further divided into sub-groups based on server sub-type. Sub-groups will be discussed in more detail in conjunction with FIG. 3. As another example, group icon 210B may represent a group including managed node elements 115B, 115C, 115G, 115H, 115J, 115K, and 115M-115O. As yet another example, group icon 210C may represent a group including printer elements 115A, 115D, 115E, and 115L. As still another example, group icon 210D may represent a group including router and/or switch elements 115F and 115T.

Group icons 210 may include information related to elements 115 and/or sub-groups included in each group. For example, group icons 210 may include information related to the group name, number of elements 115 in the group, number of alarms related to those elements 115, and severity level of the alarms. In one embodiment, group icons 210 may include an indicator 212 of the name of the group represented by group icon 210. In another embodiment, group icons 210 may include an indicator 214 of the number of elements 115 in the group. For example, in the case of group icon 210A, indicator 214A indicates that there are nine (9) elements-115F, 115P-115S, and 115U-115X—in the group. In still another embodiment, group icons 210 may include an indicator 216 of the number of alarms related to elements 115 in the group. For example, in the case of group icon 210A, indicator 216A indicates that there are twelve (12) alarms related to elements 115F, 115P-115S, and 115U-115X. At any given time, a given element 115 may experience more than one alarm; thus, the number of alarms related to elements 115 in a particular group may exceed the number of elements 115 in the group. For example, the group represented by group icon 210A includes nine (9) elements 115 and there are twelve (12) alarms related to those elements.

In yet another embodiment, group icons 210 may indicate the severity level of the alarms related to elements 115 in the group. In some embodiments, group icons 210 may be graphically displayed in a color corresponding to the alarm severity level of the group. For example, group icons 210A-210D, as shown in FIG. 2, are displayed in four different colors—red, orange, yellow, and green—each of which corresponds to a different alarm severity level—critical, major, minor, and normal. Group icon 210A, for example, is displayed in the color red, which may indicate that the alarm severity level for the group represented by group icon 210A is critical. As another example, group icon 210B is displayed in the color orange, which may indicate that the alarm severity level for the group represented by group icon 210B is major. As yet another example, group icon 210C is displayed in the color yellow, which may indicate that the alarm severity level for the group represented by group icon 210C is minor. As still another example, group icon 210D is displayed in the color green, which may indicate that the alarm severity level for the group represented by group icon 210D is normal.

As discussed above with respect to FIG. 1, monitoring module 136 may be configured to designate an alarm severity level (e.g., critical, major, minor, or normal) for each alarm, which may be based on the type of alarm triggered and/or the amount the threshold value was exceeded. The alarm severity level for each group, however, may be based on the alarm severity level of the most severe alarm experienced by an element 115 in the group. For example, indicator 216A of group icon 210A indicates that there are twelve (12) alarms related to elements 115 in the group represented by group icon 210A. Even if only one of the twelve (12) alarms is a critical alarm, the alarm severity level of the group may be critical. As another example, consider the groups represented by group icons 210A and 210B. Indicators 216A and 216B indicate that there are twelve (12) alarms related to elements 115 in the group represented by group icon 210A and twenty-three (23) alarms related to elements 115 in the group represented by group icon 210B. Even though there are more alarms related to elements 115 in the group represented by group icon 210B, the alarm severity level of the group represented by group icon 210A may be higher because the highest alarm severity level for an element in the group represented by group icon 210A is critical, while the highest alarm severity level for an element in the group represented by group icon 210B is major.

In some embodiments, monitoring module 136 (shown in FIG. 1) may be configured to sort group icons 210 based on characteristics of the groups. For example, the graphical user interface may include a sort menu 310 configured to permit a user to select (e.g., via keyboard, mouse, or other user input device) how group icons 210 are sorted. In some embodiments, group icons 210 may be sorted alphabetically by group name. In other embodiments, group icons 210 may be sorted numerically by alarm count. In still other embodiments, group icons 210 may be sorted numerically by element count. In yet other embodiments, group icons 210 may be sorted based on the alarm severity level of the groups represented by group icons 210. Consider, for example, groups 210A-210D, which have been sorted based on alarm severity (indicated by the color of group icons 210A-210D).

A user may access more detailed information regarding elements 115 (shown in FIG. 1) and/or sub-groups in a particular group by selecting (e.g., via keyboard, mouse, or other user input device) a group icon 210 associated with the particular group. For example, monitoring module 136 (shown in FIG. 1) may be configured to receive a signal indicative of the user selecting a particular group icon 210. In response, monitoring module 136 may graphically display icons representing each element 115 and/or sub-group in the particular group. Sub-group icons are discussed in additional detail in conjunction with FIG. 3, while element icons are discussed in additional detail in conjunction with FIG. 4.

Additionally, a user may search for elements 115 (shown in FIG. 1) and/or groups of elements 115 having particular characteristics. Using search bar 220, a user may input search criteria (e.g., via a keyboard or other user input device) related to characteristics of elements 115. Monitoring module 136 (shown in FIG. 1) may be configured to receive a signal indicative of the search criteria and filter elements 115 based on those criteria. Monitoring module 136 may be further configured to graphically display an icon representing each element 115 and/or group with characteristics that satisfy the search criteria. Search bar 220 and the graphical display of search results are discussed in further detail in conjunction with FIG. 6.

Figure 3:
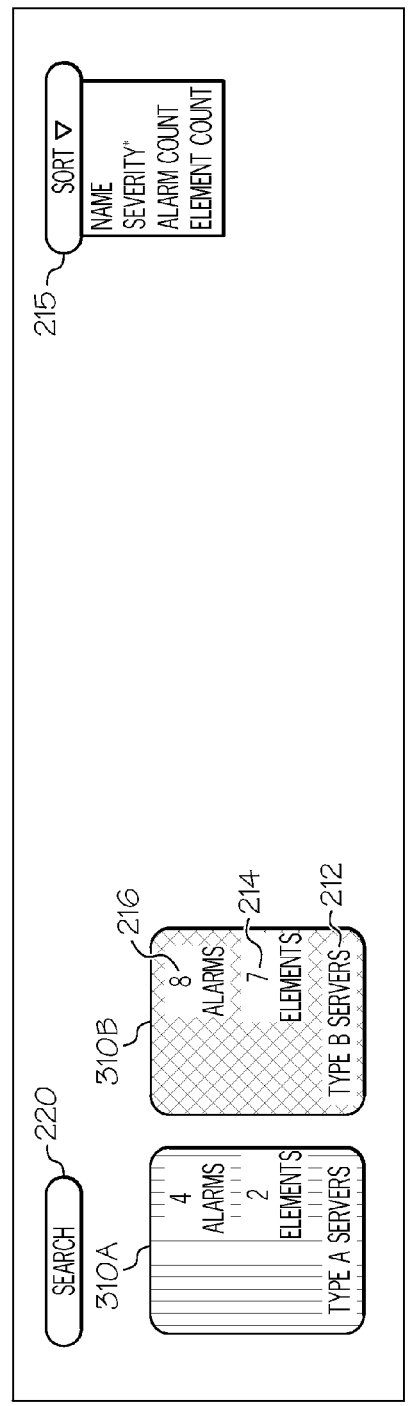
FIG. 3 is an illustration of an example graphical user interface including icons representing sub-groups, in accordance with the teachings of the present disclosure.

FIG. 3 illustrates an example graphical user interface including sub-group icons 310. As discussed above, groups of elements may be further divided into sub-groups based on element sub-type (e.g., printer model or brand). For example, group icon 210A (shown in FIG. 2) represents a server group including elements 115F, 115P-115S, and 115U-115X. The server group represented by group icon 210A may be divided into two sub-groups based on server sub-type. These sub-groups may be represented by sub-group icons 310A and 310B. Consider, for example, that elements 115F and 115P are "type-A" servers, while elements 115Q-115S and 115U-115X are "type-B" servers.

Elements 115F and 115P may be placed in a sub-group represented by sub-group icon 310A, while elements 115Q-115S and 115U-115X may be placed in a sub-group represented by sub-group icon 310B.

As discussed above with respect to FIG. 2, a user may access more detailed information regarding elements 115 and/or sub-groups in a particular group by selecting (e.g., via keyboard, mouse, or other user input device) a group icon 210 associated with the particular group. For example, monitoring module 136 may be configured to receive a signal indicative of a user selecting group icon 210 and, in response, may graphically display sub-group icons 310.

Each sub-group icon 310 may include information related to the elements in that sub-group. For example, sub-group icons 310 may include information related to the sub-group name, number of elements 115 in the sub-group, number of alarms related to those elements 115, and severity level of the alarms. In one embodiment, sub-group icons 310 may include an indicator 212 of the name of the sub-group represented by the icon. In another embodiment, sub-group icons 310 may include an indicator 214 of the number of elements 115 in the sub-group. For example, sub-group icon 310B includes indicator 214, which indicates that there are seven (7) elements, 115Q-115S and 115U-115X, in the sub-group represented by sub-group icon 310B. In still another embodiment, sub-group icons 310 may include an indicator 216 of the number of alarms related to elements 115 in the sub-group. For example, sub-group icon 310B includes indicator 216, which indicates that there are eight (8) alarms related to elements 115Q-115S and 115U-115X in the sub-group.

In yet another embodiment, sub-group icons 310 may indicate the severity level of the alarms related to elements 115 in the sub-group. In some embodiments, sub-group icons 310 may be graphically displayed in a color corresponding to the alarm severity level of the sub-group. Consider, for example, sub-group icons 310A and 310B. Sub-group icon 310A is displayed in red, which may indicate that the alarm severity level for the sub-group represented by sub-group icon 310A is critical. Sub-group icon 310B is displayed in orange, which may indicate that the alarm severity level for the sub-group represented by sub-group icon 310B is major. As discussed above with respect to FIG. 2, the alarm severity level for a group or sub-group may be based on the severity level of the most severe alarm experienced by an element 115 in the group or sub-group. For example, indicator 216 of group icon 310B indicates that there are eight (8) alarms related to elements 115Q-115S and 115U-115X, which are included in the group represented by group icon 310B. Even if only one of the eight (8) alarms is a major alarm, the alarm severity level of the sub-group represented by sub-group icon 310B may be major.

Like group icons 210, sub-group icons 310 may be sorted using sort menu 215. Sub-group icons 310 may be sorted based on characteristics of the sub-groups, such as name, alarm count, element count, or alarm severity level. As shown in FIG. 3, sub-group icons 310 have been sorted by alarm severity level. A user may access information related to the elements 115 included in each sub-group by selecting (e.g., via a keyboard, mouse, or other user input device) a particular sub-group icon 310. For example, monitoring module 136 (shown in FIG. 1) may be configured to receive a signal indicative of the user selecting a particular sub-group icon 310. In response, monitoring module 136 may graphically display icons representing each element 115 in the particular sub-group. Element icons are discussed in additional detail with respect to FIG. 4.

Figure 4:
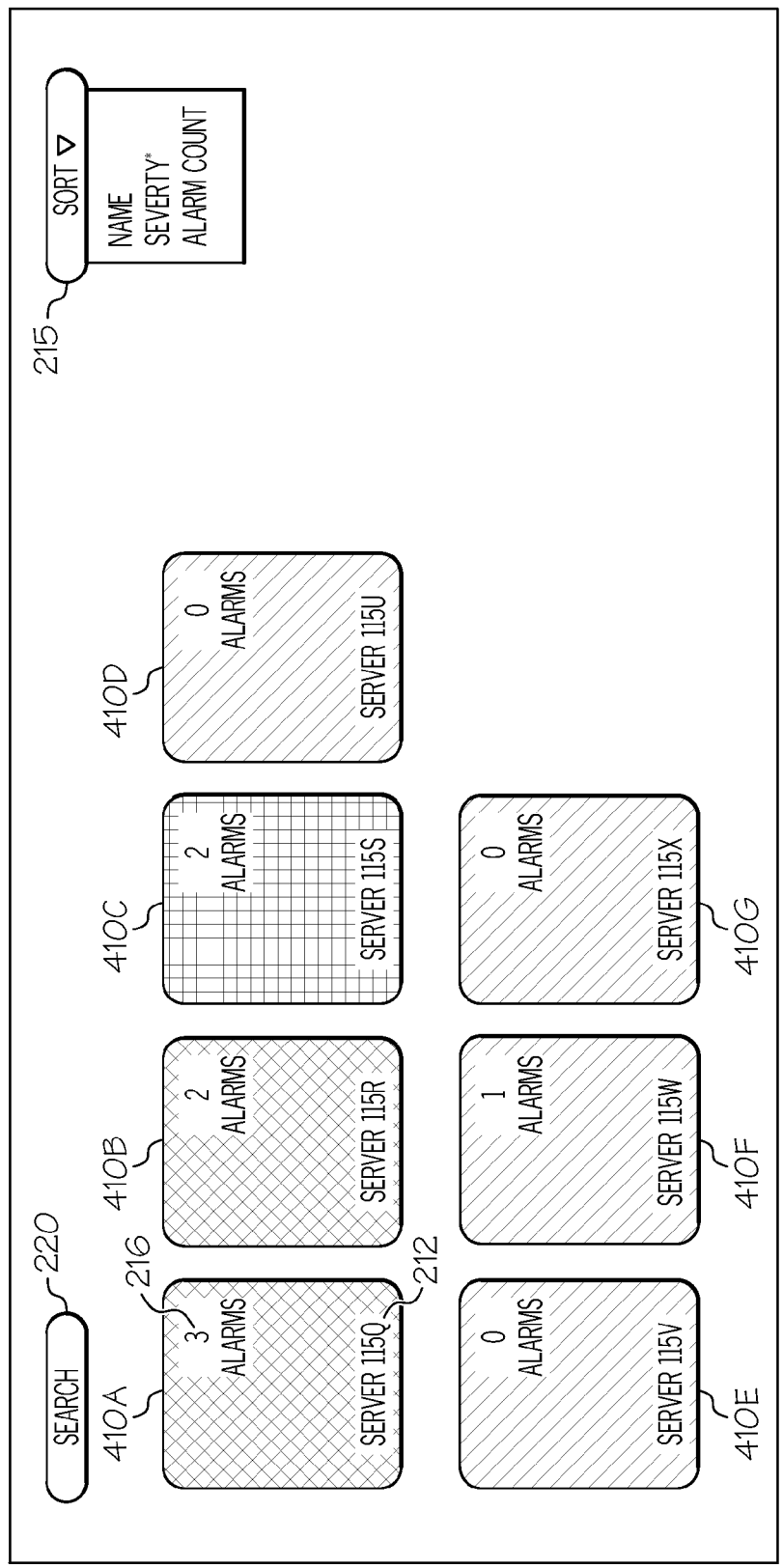
FIG. 4 is an illustration of an example graphical user interface including icons representing individual elements, in accordance with the teachings of the present disclosure.

FIG. 4 is an illustration of an example graphical user interface including individual monitored elements. Element icons 410A-410G may represent elements 115Q-115S and 115U-115X of the type-B server sub-group, which may be represented by sub-group icon 310B (shown in FIG. 3). Element icons 410 may include information related to elements 115 represented by the icons. For example, element icons 410 may include the name of element 115 represented by element icon 410, as well as the number of alarms related to element 115. In some embodiments, element icons 410 may include an indicator 212 of the name of elements 115 represented by element icons 410. For example, element icon 410A includes indicator 212, which indicates the name of the element 115Q represented by element icon 410A. In other embodiments, element icons 410 may include an indicator 216 of the number of alarms related to elements 115 represented by element icons 410. For example, element icon 410A includes indicator 216, which indicates that there are three (3) alarms related to element 115Q.

In still other embodiments, element icons 410 may indicate the alarm severity level of elements 115 represented by element icons 410. For example, element icons 410 may be graphically displayed in a color corresponding to the alarm severity level of elements 115 represented by element icons 410. As discussed above with respect to FIG. 1, the alarm severity level for each element 115 may be designated based on the most severe alarm related to each element 115. For example, indicator 216 of element icon 310A indicates that there are three (3) alarms related to element 115Q. Even if only one of the three (3) alarms is a critical alarm, the alarm severity level of element 115Q may still be designated as critical. Element icons 410A-410G, as shown in FIG. 4, are displayed in colors—orange, yellow, and green—corresponding to the alarm severity—major, minor, and normal—of each element 115 represented by element icons 410A-410G.

Like group icons 210 and sub-group icons 310, element icons 410 may be sorted using sort menu 215. Element icons 410 may be sorted based on characteristics of elements 115 represented by element icons 410, such as element name, alarm count, or alarm severity level. As shown in FIG. 4, element icons 410 have been sorted by alarm severity level.

A user may access information related to elements 115 represented by element icons 410 by selecting (e.g., via a keyboard, mouse, or other user input device) a particular element icon 410. For example, monitoring module 136 (shown in FIG. 1) may be configured to receive a signal indicative of the user selecting a particular element icon 410. In response, monitoring module 136 may graphically display element-specific frames, which may include information related to a particular element 115 represented by element icon 410. Element-specific frames are described in more detail in conjunction with FIG. 5.

Figure 5:
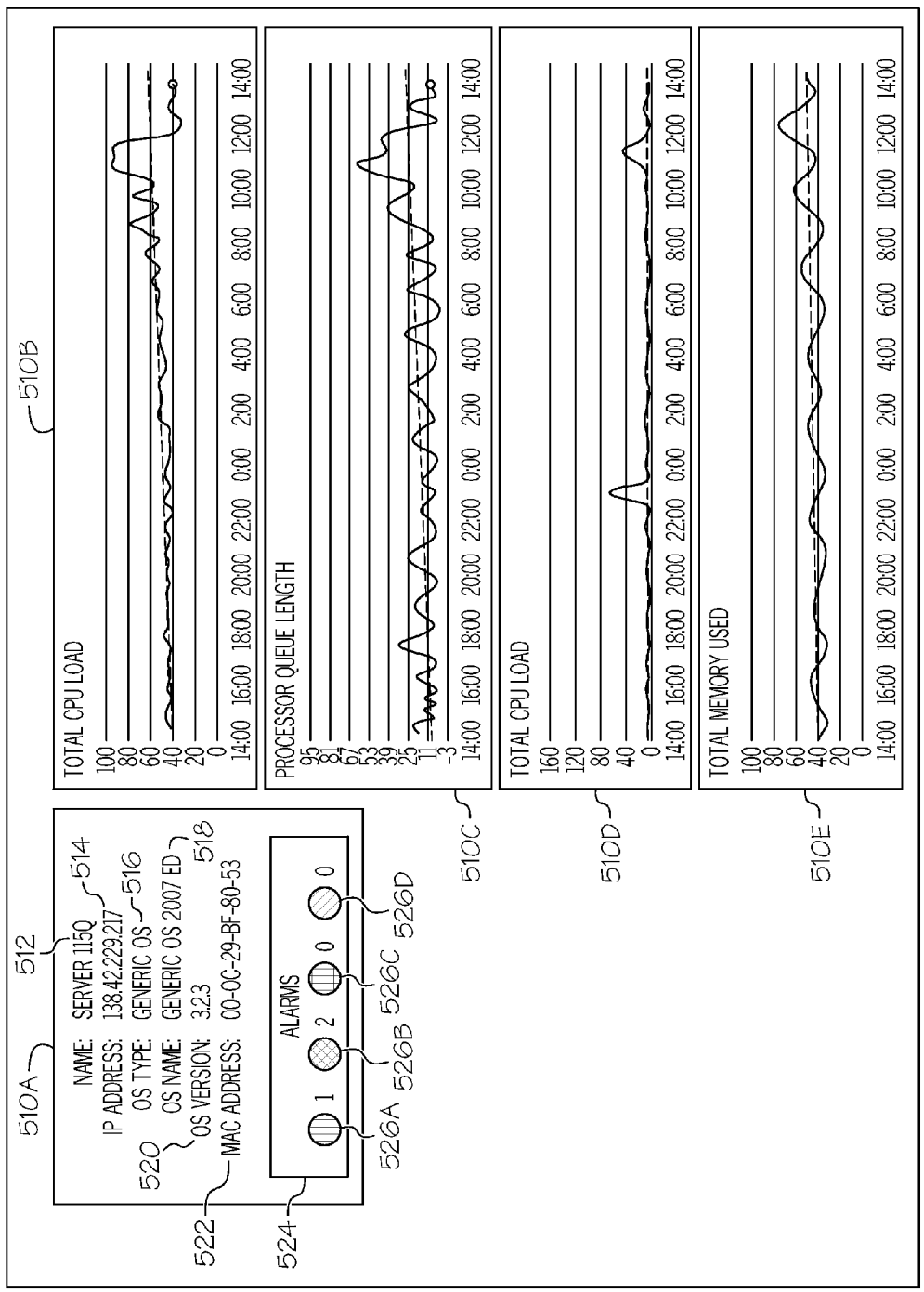
FIG. 5 is an illustration of an example graphical user interface including element-specific frames, in accordance with the teachings of the present disclosure.

FIG. 5 is an illustration of an example graphical user interface including element-specific frames 510, in accordance with the teachings of the present disclosure. Specifically, FIG. 5 illustrates element-specific frames 510, which include information related to element 115Q (shown in FIG. 1). As discussed above in conjunction with FIG. 4, a user may access information related to a particular element 115 by selecting (via a keyboard, mouse, or other user input device) a particular element icon 410. In response, monitoring module 136 (shown in FIG. 1) may graphically display element-specific frames 510 including information related to the particular element 115 represented by element icon 410 (shown in FIG. 4). For example, a user may access information related to element 115Q by selecting element specific icon 410A. In response, monitoring module 136 may graphically display element-specific frames 510A-510E.

Element-specific frames 510 may be generated by monitoring module 136 (shown in FIG. 1) based on information collected by monitoring module 136. As discussed above in conjunction with FIG. 1, monitoring module 136 may actively and/or passively monitor the status and/or condition of elements 115 and collect information related to each element 115. In some embodiments, element specific frames 510 may include information related to static characteristics of elements 115, such as element name, IP address, operating system type, and/or operating system name and version. In other embodiments, element specific frames 510 may include information related to dynamic characteristics of elements 115, such a number and severity level of alarms, processor usage and performance, and/or memory usage and performance.

For example, element-specific frame 510A, as shown in FIG. 5, may include an indicator 512 of an element name of element 115Q, an indicator 514 of an IP address of element 115Q, an indicator 516 of an operating system type of element 115Q, an indicator 518 of an operating system name of the operating system of element 115Q, an indicator 520 of a version of the operating system of element 115Q, and an indicator 522 of a MAC address of element 115Q. As shown in FIG. 5, element-specific frame 510A may also include an indicator 524 of the number of alarms related to element 115Q in each alarm severity level. Indicator 524 may include indicators 526A-526D, each of which includes a graphical indicator indicating the alarm severity level and a numerical indicator indicating a number of alarms at the alarm severity level. For example, as shown in FIG. 5, indicator 526A includes a red circle, which may indicate a critical alarm severity level, and a numerical indicator, which indicates that there is one (1) critical alarm related to element 115Q. As another example, indicator 526B, as shown in FIG. 5, includes an orange circle, which may indicate a major alarm severity level, and a numerical indicator, which indicates that there are two (2) major alarms related to element 115Q.

Element-specific frame 510B, as shown in FIG. 5, includes information related to processor usage of element 115Q. Specifically, element-specific frame 510B illustrates a percentage of the processor capacity of element 115Q that is being used over a period of time. Element-specific frame 510C includes information related to processor performance of element 115Q. Specifically, element-specific frame 510C illustrates a processor queue length for element 115Q over a period of time. Similarly, element-specific frames 510D and 510E include information related to memory performance and usage of element 115Q. The information displayed in element-specific frames 510 may be displayed in a chart, table, graph, or any other suitable format. Additionally, although example element-specific frames 510 have been illustrated in FIG. 5, element-specific frames may include information related to any static and/or dynamic characteristics of elements 115.

Figure 6:
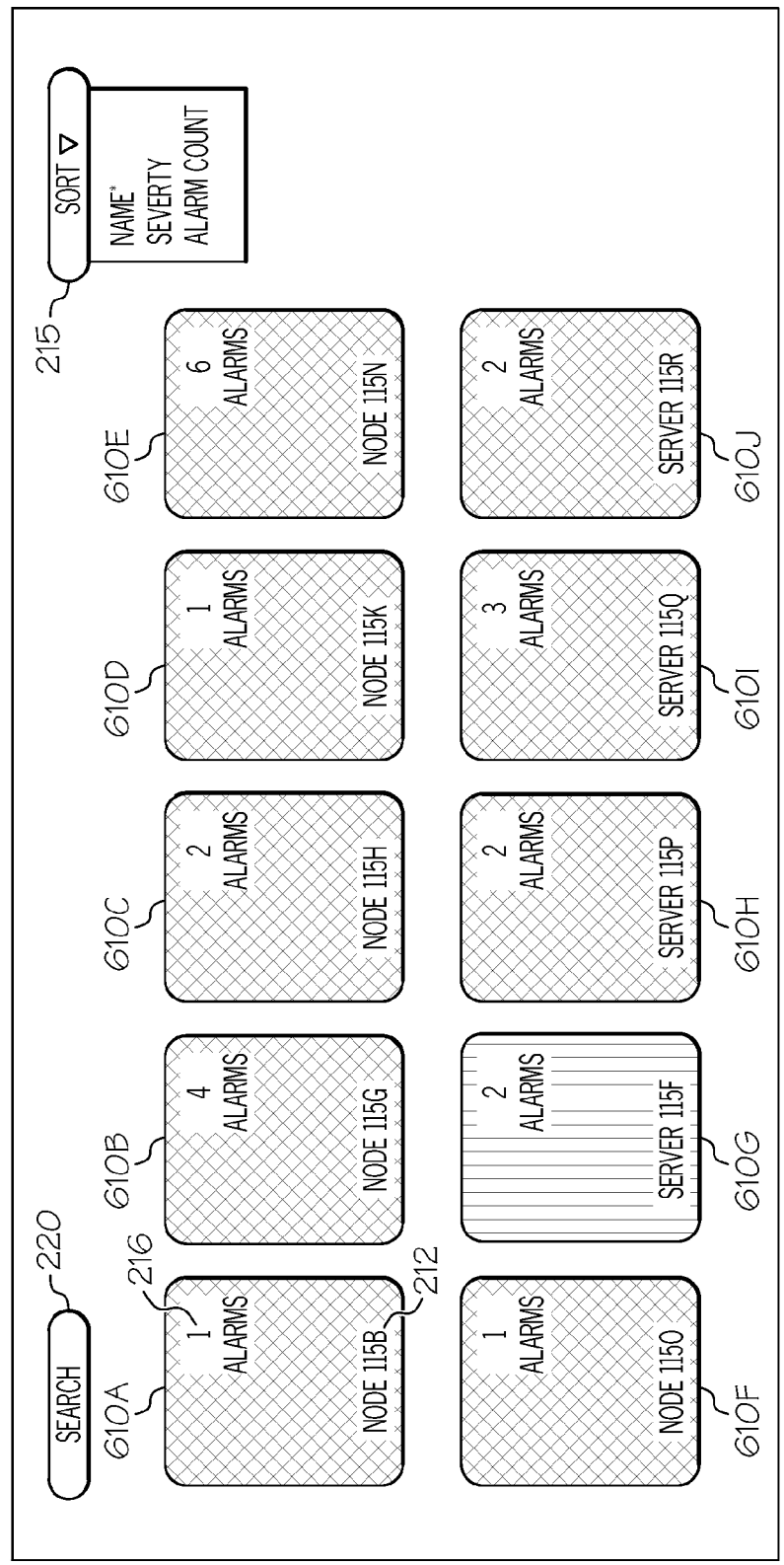
FIG. 6 is an illustration of an example graphical user interface including icons representing elements displayed in a search result set, in accordance with the teachings of the present disclosure.

FIG. 6 illustrates an example graphical user interface including element icons graphically displayed as search results. As discussed above in conjunction with FIG. 2, a user may search for elements 115 (shown in FIG. 1) or groups of elements 115. Using search bar 220, a user may input search criteria related to characteristics of elements 115. For example search criteria may relate to element name, element type, a number of alarms per element, alarm severity level, and/or other characteristics of elements 115. Monitoring module 136 (shown in FIG. 1) may be configured to receive a signal indicative of the user-selected search criteria and filter elements 115 based on those criteria. Monitoring module 136 may be further configured to graphically display an element icon 610 representing each element 115 with characteristics that satisfy the search criteria.

For example, monitoring module 136 may receive a signal indicating that, using search bar 220, a user has initiated a search for elements 115 with at least one alarm with a severity level of major. Monitoring module 136 may filter elements 115 for elements with at least one major alarm and graphically display element icons 610A-610J, each of which represents an element 115 with at least one major alarm.

As another example, monitoring module 136 may receive a signal indicating that, using search bar 220, a user has initiated a search for elements 115 with more than five (5) alarms. Monitoring module 136 may filter elements 115 for elements with more than five (5) alarms and graphically display an element icon 610 representing each element with more than five (5) alarms.

Like element icons 410 (shown in FIG. 4), element icons 610 may include information related to elements 115 represented by element icons 610. For example, element icons 610 may include the name of element 115 represented by element icon 610, as well as the number of alarms related to element 115. In some embodiments, element icons 610 may include an indicator 212 of the name of elements 115 represented by element icons 610. For example, element icon 610A includes indicator 212, which indicates the name of element 115B represented by element icon 610A. In other embodiments, element icons 610 may include an indicator 216 of the number of alarms related to elements 115 represented by element icons 610. For example, element icon 610A includes indicator 216, which indicates that there is one (1) alarm related to element 115B.

Additionally, element icons 610 may indicate the alarm severity level of elements 115 represented by element icons 610. In some embodiments, element icons 610 may be graphically displayed in a color corresponding to the alarm severity level of elements 115 represented by element icons 610. As discussed above with respect to FIG. 4, the alarm severity level for each element 115 may be designated based on the alarm severity level of the most severe alarm related to each element 115.

Figure 7:
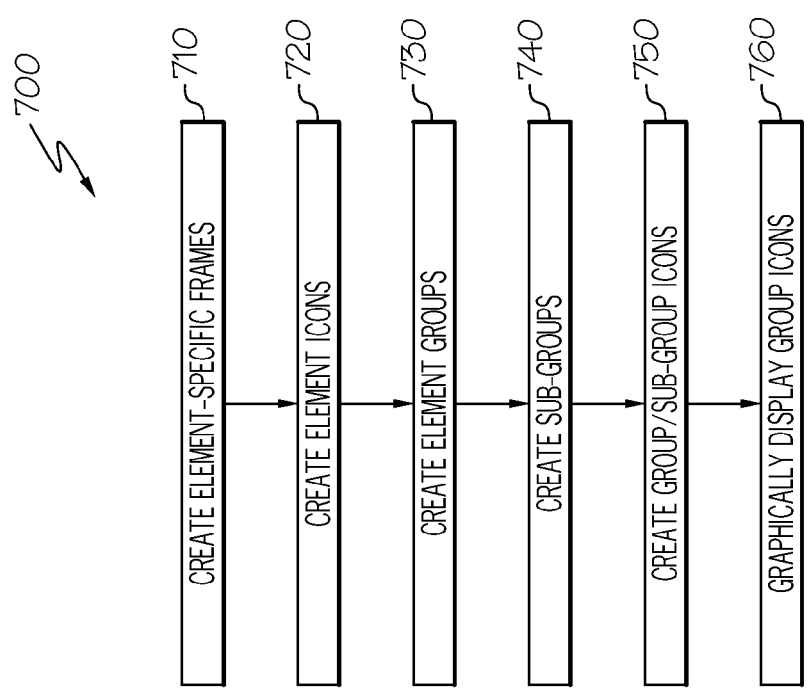
FIG. 7 is a flowchart of an example method of generating a graphical user interface, in accordance with the teachings of the present disclosure.

FIG. 7 is a flowchart of an example method 700 of generating a graphical user interface in accordance with the teachings of the present disclosure. Although FIG. 7 discloses a particular number of steps to be taken with respect to example method 700, method 700 may be executed with more or fewer steps than those depicted in FIG. 7. In addition, although FIG. 7 discloses a certain order of steps to be taken with respect to method 700 the steps comprising these methods may be completed in any suitable order. Method 700 may be implemented using the system of FIG. 1 or any other suitable mechanism. In certain embodiments, method 700 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 700 may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

In some embodiments, method 700 may begin at step 710. At step 710, the monitoring module of the monitoring node may create element-specific frames for each element. As discussed above, element-specific frames may be generated by the monitoring module based on information collected by the monitoring module. Element-specific frames may include information related to static and/or dynamic characteristics of each element, such as element name, IP address, operating system type, operating system name and version, number and severity level of alarms, processor usage and performance, and memory usage and performance, etc.

At step 720, the monitoring module may create element icons for each element. As discussed above, element icons may include information related to characteristics of the element represented by the icon. For example, an element icon may include an indicator of the element name and the number of alarms related to the element. Additionally, the element icon may indicate the alarm severity level for the element represented by the icon. For example, the element icon may be displayed in a color corresponding to the alarm severity level for the element represented by the icon. As discussed above, the alarm severity level for a particular element may be the alarm severity level of the most severe alarm related to the element.

At step 730, the monitoring module may group elements based on characteristics of the elements. A system administrator may identify element characteristics based on which the elements may be grouped. As discussed above in conjunction with FIG. 1, elements may be grouped based on element characteristics, such as element type (e.g., servers, printers, etc.), the business organization and/or department to which an element belongs, and/or the relationships among elements.

At step 740, the monitoring module may further divide the groups into sub-groups. As discussed above in conjunction with FIG. 3, groups may include individual elements and/or sub-groups. Sub-groups may be created where a group includes elements that may be further sub-divided based on the characteristic(s) used to establish the group. For example, a group established based on element type may be further divided into sub-groups based on element sub-type. As an example, consider the group of server elements represented by group icon 210A (shown in FIG. 2). The group represented by group icon 210A may be further divided into two sub-groups based on element sub-type, which may be represented by sub-group icons 310A and 310B (shown in FIG. 3).

At step 750, the monitoring module may create icons representing the groups and sub-groups created at steps 730 and 740, respectively. Group and sub-group icons may include information related to the elements in the group or sub-group. For example, group and sub-group icons may include indicators of the group or sub-group name, as well as the number of elements and/or number of alarms related to the elements in the group or sub-group represented by the icon. Consider, for example, the group represented by group icon 210A (shown in FIG. 2). Indicator 214A of group icon 210A indicates the total number of elements in the group represented by group icon 210A, even if those elements are also included in a sub-group. Similarly, indicator 216A indicates the total number of alarms related to the elements in the group represented by group icon 210A, even if the elements are also included in a sub-group.

Additionally, group and sub-group icons may indicate the alarm severity level for the group or sub-group represented by the icon. For example, group and sub-group icons may be displayed in a color corresponding to the most severe alarm experienced by an element in the group. For example, if the most severe alarm experienced by an element in the group is a critical alarm, the group icon may be red. Groups in which the most severe alarm experienced by an element in the group is major, minor, or normal may be orange, yellow, or green, respectively. Consider, for example, the group represented by group icon 210A (shown in FIG. 2), which has been further divided into two sub-groups represented by sub-group icons 310A and 310B (shown in FIG. 3). If the most severe alarm experienced by an element in the sub-group represented by sub-group icon 310A is a critical alarm, sub-group icon 310A may be displayed in the color red. If the most severe alarm experienced by an element in the sub-group represented by sub-group icon 310B is a major alarm, sub-group icon 310B may be displayed in the color orange. Because the sub-group represented by sub-group icon 310A includes an element with a critical alarm, the alarm severity level for the group represented by group icon 210A may also be critical and group icon 210A may be displayed in the color red.

At step 760, the monitoring node may graphically display icons representing each group. When a user selects a particular group icon (e.g., via a mouse, keyboard, or other user input device), the monitoring node may graphically display icons representing the elements or sub-groups within that group. Similarly, when a user selects a particular sub-group icon, the monitoring node may graphically display icons representing the elements within that sub-group. When a user selects an element icon, the monitoring node may graphically display element-specific frames related to that element.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of generating a graphical user interface, the method comprising:
   monitoring a plurality of elements of a computer system;
   collecting information related to each element of the plurality of elements;
   creating a first group icon including information related to a first element group, the first element group including a first set of elements of the plurality of elements of the computer system, wherein the first set of elements are grouped based on a relationship among the first set of elements, and wherein the relationship comprises a common element type;
   creating a first set of element icons, each element icon including information related to a particular element of the first set of elements, wherein the information comprises at least one of an element name, a number of alarms, and an alarm severity level;
   graphically displaying the first group icon;
   designating an alarm severity level for each element of the first set of elements, wherein the alarm severity level is designated based on the type of alarm triggered and the amount by which a threshold value is exceeded, wherein the alarm severity level comprises one of critical, major, minor, or normal, and wherein the type of alarm triggered relates to at least one of response time, performance, status, or availability of the elements, such that when a threshold value associated with a first type of alarm for a first element is exceeded, a first alarm severity level is designated for the first element based on the threshold value and the type of alarm triggered;
   graphically displaying the alarm severity level for each element of the first set of elements, wherein graphically displaying the alarm severity level for each element of the first set of elements comprises graphically displaying each element icon in a color corresponding to the alarm severity level of the corresponding element represented by each element icon;
   identifying a particular element of the first set of elements with an alarm severity level more severe than or equally severe as the alarm severity level for each remaining element of the first set of elements;
   designating an alarm severity level for the first element group, wherein the alarm severity level for the first element group is equivalent to the alarm severity level of the particular element of the first set of elements;
   graphically displaying the alarm severity level for the first element group, wherein graphically displaying the alarm severity level comprises graphically displaying the first element group icon in a color corresponding to the alarm severity level of the particular element of the first set of elements;
   identifying a number of the plurality of the first set of elements that are in an alarm state;
   displaying the first group icon with the alarm severity level for the first element group, a number of the plurality of elements included in the first element group, and the number of the plurality of the first set of elements that are in the alarm state;
   creating a second group icon including information related to a second element group, the second element group including a second set of elements of the plurality of elements;
   creating a second set of element icons, each element icon of the second set of element icons including information related to a particular element of the second set of elements;
   graphically displaying the second group icon;
   receiving search criteria from a user;
   filtering the plurality of elements in response to receiving the search criteria;
   generating a search result set, the search result set comprising a subset of the plurality of elements, wherein the subset of the plurality of elements includes at least one of the first set of elements and at least one of the second set of elements of the plurality of elements, and wherein each element of the subset of the plurality of elements in the search result set has a characteristic that satisfies the search criteria; and
   graphically displaying a plurality of search element icons comprising an element icon representing each element with characteristics that satisfy the search criteria.

2. The method of claim 1, the method further comprising triggering an alarm when a characteristic of an element of the plurality of elements meets or exceeds a pre-defined alarm criteria.

3. The method of claim 1, wherein graphically displaying the first group icon comprises graphically displaying the first group icon in a color corresponding to the alarm severity level of the first element group.

4. The method of claim 1, wherein graphically displaying the first group icon comprises graphically displaying of a name of the first element group.

5. The method of claim 1, further comprising:
   creating a second group icon including information related to a second element group, the second element group including a first sub-group and a second sub-group;
   creating a first sub-group icon including information related to the first sub-group, the first sub-group including a second set of elements of the plurality of elements;

creating a second sub-group icon including information related to the second sub-group, the second sub-group including a third set of elements of the plurality of elements;

graphically displaying the second group icon; and graphically displaying the first sub-group icon and the second sub-group icon in response to receiving a signal indicating that a user has selected the first group icon.

6. The method of claim 5, further comprising:

designating an alarm severity level for each element of the second and third sets of elements;

identifying a particular element of the second and third sets of elements with an alarm severity level that is greater than or equal to the alarm severity level for each remaining element of the second and third sets of elements;

designating an alarm severity level for the second element group, the alarm severity level for the second element group equivalent to the alarm severity level of the particular element of the second and third sets of elements; and graphically displaying the second group icon in a color corresponding to the alarm severity level of the second element group.

7. A computer readable storage medium, comprising computer-executable instructions carried on the computer readable medium, the instructions readable by a processor and, when read and executed, configured to cause the processor to:

monitor a plurality of elements of a computer system;

collect information related to each element of the plurality of elements;

create a first group icon including information related to a first element group, the first element group including a first set of elements of the plurality of elements of the computer system, wherein the first set of elements are grouped based on a relationship among the first set of elements, and wherein the relationship comprises a common element type;

create a first set of element icons, each element icon including information related to a particular element of the first set of elements;

graphically display the first group icon;

graphically display the first set of element icons in response to receiving a signal indicating that a user has selected the first group icon, wherein graphically display the first set of element icons comprises graphically display at least one of an element name, a number of alarms, and an alarm severity level; and graphically display a first element-specific frame in response to receiving a signal indicating that the user has selected a particular element icon of the first set of element icons;

designate an alarm severity level for each element of the first set of elements, wherein the alarm severity level is designated based on the type of alarm triggered and the amount by which a threshold value is exceeded, wherein the alarm severity level comprises one of critical, major, minor, or normal, and wherein the type of alarm triggered relates to at least one of response time, performance, status, or availability of the elements, such that when a threshold value associated with a first type of alarm for a first element is exceeded, a first alarm severity level is designated for the first element based on the threshold value and the type of alarm triggered;

graphically display the alarm severity level for each element of the first set of elements, wherein graphically display the alarm severity level for each element of the first set of elements comprises graphically display each element icon in a color corresponding to the alarm severity level of the corresponding element represented by each element icon;

identify a particular element of the first set of elements with an alarm severity level greater than or equal to the alarm severity level for each remaining element of the first set of elements;

designate an alarm severity level for the first element group, the alarm severity level for the first element group equivalent to the alarm severity level of the particular element of the first set of elements;

graphically display the alarm severity level for the first element group, wherein graphically display the alarm severity level comprises graphically display the first element group icon in a color corresponding to the alarm severity level of the particular element of the first set of elements;

identify a number of the plurality of the first set of elements that are in an alarm state; and graphically display a plurality of search element icons comprising an element icon representing each element with characteristics that satisfy the search criteria.

8. The computer-readable medium of claim 7, the instructions, when read and executed, further configured to cause the processor to trigger an alarm when a characteristic of an element of the plurality of elements meets or exceeds a pre-defined alarm criteria.

9. The computer-readable medium of claim 7, wherein graphically displaying the first group icon comprises graphically displaying the first group icon in a color corresponding to the alarm severity level of the first element group.

10. The computer-readable medium of claim 7, wherein graphically displaying the first group icon comprises graphically display at least one of a name of the first element group, a number of elements included in the first set of elements, and a number of alarms related to the first set of elements.

11. The computer-readable medium of claim 7, the instructions, when read and executed, further configured to cause the processor to:

create a second group icon including information related to a second element group, the second element group including a first sub-group and a second sub-group;

create a first sub-group icon including information related to the first sub-group, the first sub-group including a second set of elements of the plurality of elements;

create a second sub-group icon including information related to the second sub-group, the second sub-group including a third set of elements of the plurality of elements;

graphically display the second group icon; and graphically display the first sub-group icon and the second sub-group icon in response to receiving a signal indicating that a user has selected the first group icon.

12. The computer-readable medium of claim 11 the instructions, when read and executed, further configured to cause the processor to:

designate an alarm severity level for each element of the second and third sets of elements;

identify a particular element of the second and third sets of elements with an alarm severity level that is greater than or equal to the alarm severity level for each remaining element of the second and third sets of elements;
designate an alarm severity level for the second element group, the alarm severity level for the second element group equivalent to the alarm severity level of the particular element of the second and third sets of elements; and
graphically display the second group icon in a color corresponding to the alarm severity level of the second element group.

13. The computer-readable medium of claim 7, the instructions, when read and executed, further configured to cause the processor to:
create a second group icon including information related to a second element group, the second element group including a second set of elements of the plurality of elements;
create a second set of element icons, each element icon of the second set of element icons including information related to a particular element of the second set of elements;
graphically display the second group icon;
receive search criteria from a user;
filter the plurality of elements to generate a search result set in response to receiving the search criteria, the search result set including at least one of the first set of elements and at least one of the second set of elements of the plurality of elements, each having a characteristic that satisfies the search criteria; and
graphically display, with the first group icon and the second group icon, a search result element icon representing each element of the search result set.

14. An apparatus for monitoring a plurality of elements of a computer system, the apparatus comprising:
a processor; and
a memory communicatively coupled to the processor, the memory comprising instructions operable, when executed by the processor, to cause the processor to:
monitor a plurality of elements of a computer system;
collect information related to each element of the plurality of elements;
create a first group icon including information related to a first element group, the first element group including a first set of elements of the plurality of elements of the computer system, wherein the first set of elements are grouped based on a relationship among the first set of elements, and wherein the relationship comprises a common element type;
create a first set of element icons, each element icon including information related to a particular element of the first set of elements, wherein the information comprises at least one of an element name, a number of alarms, and an alarm severity level;
graphically display the first group icon;
graphically display the first set of element icons in response to receiving a signal indicating that a user has selected the first group icon, wherein graphically display the first set of element icons comprises graphically display at least one of an element name, a number of alarms, and an alarm severity level; and
graphically display a first element-specific frame in response to receiving a signal indicating that the user has selected a particular element icon of the first set of element icons;
designate an alarm severity level for each element of the first set of elements, wherein the alarm severity level is designated based on the type of alarm triggered and the amount by which a threshold value is exceeded, wherein the alarm severity level comprises one of critical, major, minor, or normal, and wherein the type of alarm triggered relates to at least one of response time, performance, status, or availability of the elements, such that when a threshold value associated with a first type of alarm for a first element is exceeded, a first alarm severity level is designated for the first element based on the threshold value and the type of alarm triggered;
graphically display the alarm severity level for each element of the first set of elements, wherein graphically display the alarm severity level for each element of the first set of elements comprises graphically display each element icon in a color corresponding to the alarm severity level of the corresponding element represented by each element icon;
identify a particular element of the first set of elements with an alarm severity level greater than or equal to the alarm severity level for each remaining element of the first set of elements;
designate an alarm severity level for the first element group, the alarm severity level for the first element group equivalent to the alarm severity level of the particular element of the first set of elements;
graphically display the alarm severity level for the first element group, wherein graphically display the alarm severity level comprises graphically display the first element group icon in a color corresponding to the alarm severity level of the particular element of the first set of elements;
identify a number of the plurality of the first set of elements that are in an alarm state; and
display the first group icon with the alarm severity level for the first element group, a number of the plurality of elements included in the first element group, and the number of the plurality of the first set of elements that are in the alarm state.

15. The apparatus of claim 14, wherein the memory further comprises instructions operable, when executed by the processor, to cause the processor to trigger an alarm when a characteristic of an element of the plurality of elements meets or exceeds a pre-defined alarm criteria.

16. The apparatus of claim 15, wherein graphically displaying the first group icon comprises graphically displaying the first group icon in a color corresponding to the alarm severity level of the first element group.

17. The apparatus of claim 14, wherein graphically displaying the first group icon comprises graphically displaying at least one of a name of the first element group, a number of elements included in the first set of elements, and a number of alarms related to the first set of elements.

18. The apparatus of claim 14, wherein the memory further comprises instructions operable, when executed by the processor, to cause the processor to:
create a second group icon including information related to a second element group, the second element group including a first sub-group and a second sub-group;
create a first sub-group icon including information related to the first sub-group, the first sub-group including a second set of elements of the plurality of elements;
create a second sub-group icon including information related to the second sub-group, the second sub-group including a third set of elements of the plurality of elements;

graphically display the second group icon; and graphically display the first sub-group icon and the second sub-group icon in response to receiving a signal indicating that a user has selected the first group icon.

19. The apparatus of claim 18, wherein the memory further comprises instructions operable, when executed by the processor, to cause the processor to:

designate an alarm severity level for each element of the second and third sets of elements;

identify a particular element of the second and third sets of elements with an alarm severity level that is greater than or equal to the alarm severity level for each remaining element of the second and third sets of elements;

designate an alarm severity level for the second element group, the alarm severity level for the second element group equivalent to the alarm severity level of the particular element of the second and third sets of elements; and graphically display the second group icon in a color corresponding to the alarm severity level of the second element group.

20. The apparatus of claim 14, wherein the memory further comprises instructions operable, when executed by the processor, to cause the processor to:

create a second group icon including information related to a second element group, the second element group including a second set of elements of the plurality of elements;

create a second set of element icons, each element icon of the second set of element icons including information related to a particular element of the second set of elements;

graphically display the second group icon;

receive search criteria from a user;

filter the plurality of elements to generate a search result set in response to receiving the search criteria, the search result set including at least one of the first set of elements and at least one of the second set of elements of the plurality of elements, each having a characteristic that satisfies the search criteria; and graphically display, with the first group icon and the second group icon, a search result element icon representing each element of the search result set.

21. The method of claim 1, further comprising:

graphically displaying the first set of element icons in response to receiving a signal indicating that a user has selected the first group icon; and graphically displaying a first element-specific frame in response to receiving a signal indicating that the user has selected a particular element icon of the first set of element icons.

* * * * *

UNITED STATES PATENT AND TRADEMARK OFFICE
CERTIFICATE OF CORRECTION

PATENT NO.        : 9,916,068 B1
APPLICATION NO.   : 13/800192
DATED             : March 13, 2018
INVENTOR(S)       : Mark Bell et al.

Page 1 of 1

It is certified that error appears in the above-identified patent and that said Letters Patent is hereby corrected as shown below:

On the Title Page

Item (72), Line 4:
Please change "Campbell, CO (US)" to --Winchester, CA (US)--

Signed and Sealed this
Fifth Day of June, 2018

Andrei Iancu
*Director of the United States Patent and Trademark Office*